Dec. 25, 1945.  H. W. HAPMAN  2,391,700
RESILIENT FLIGHT CONVEYER
Filed March 23, 1942  3 Sheets-Sheet 1
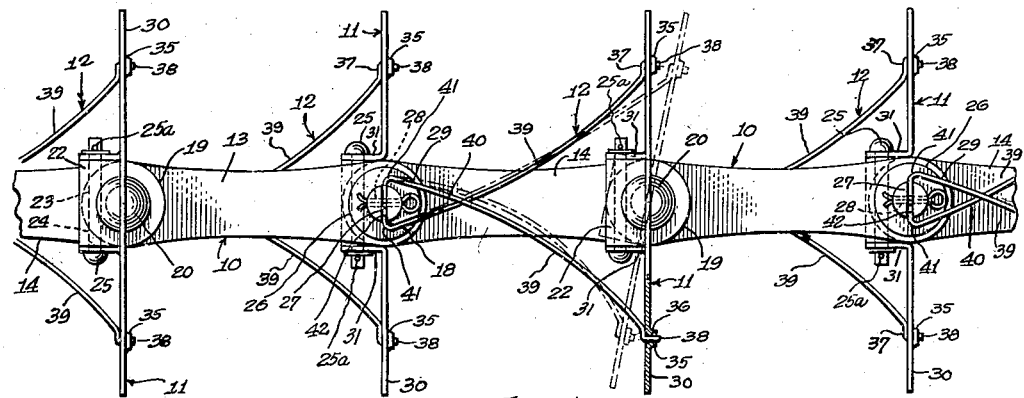
Inventor
Henry W. Hapman,
By Barthel & Bugbee
Attorneys

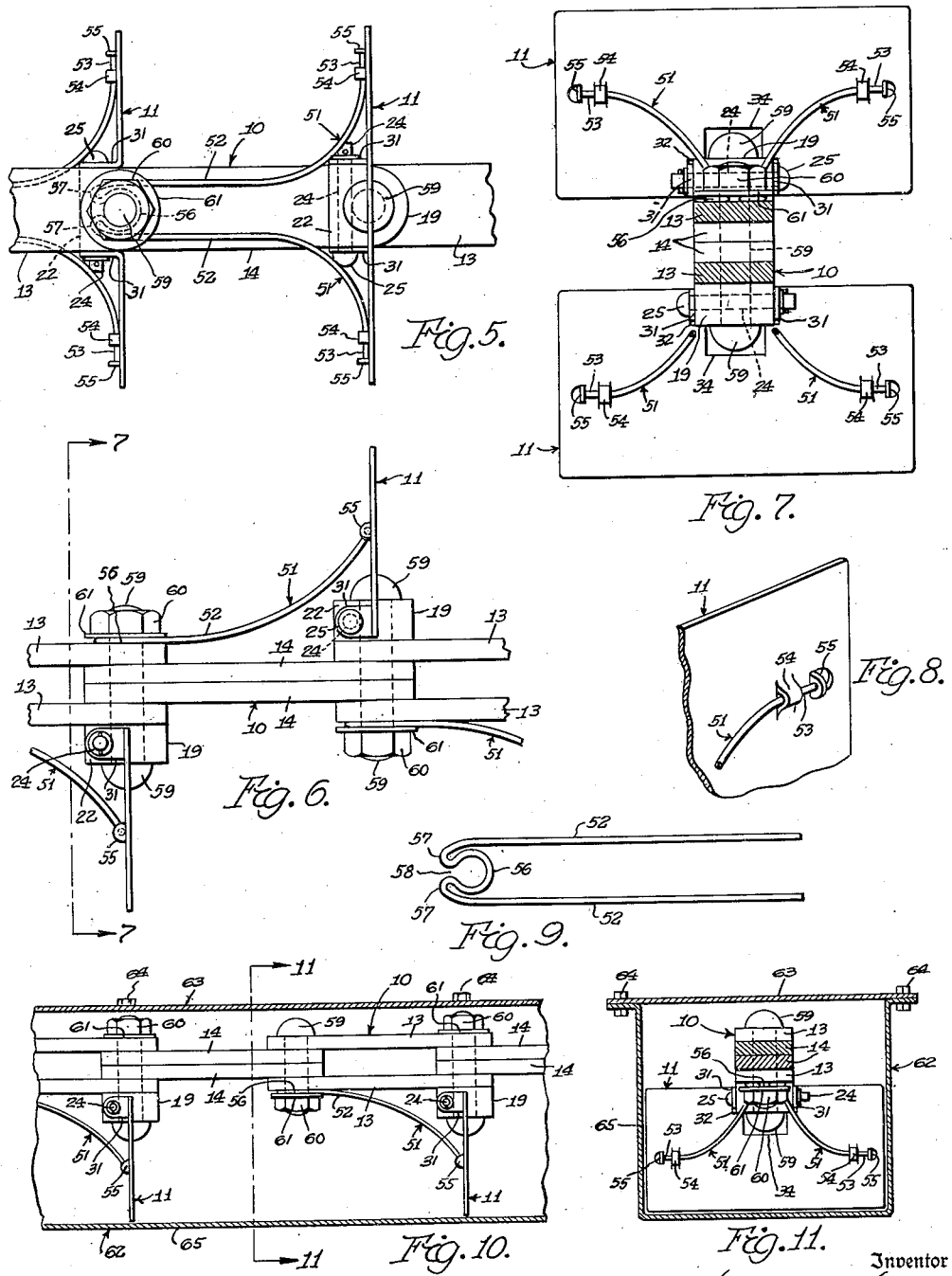

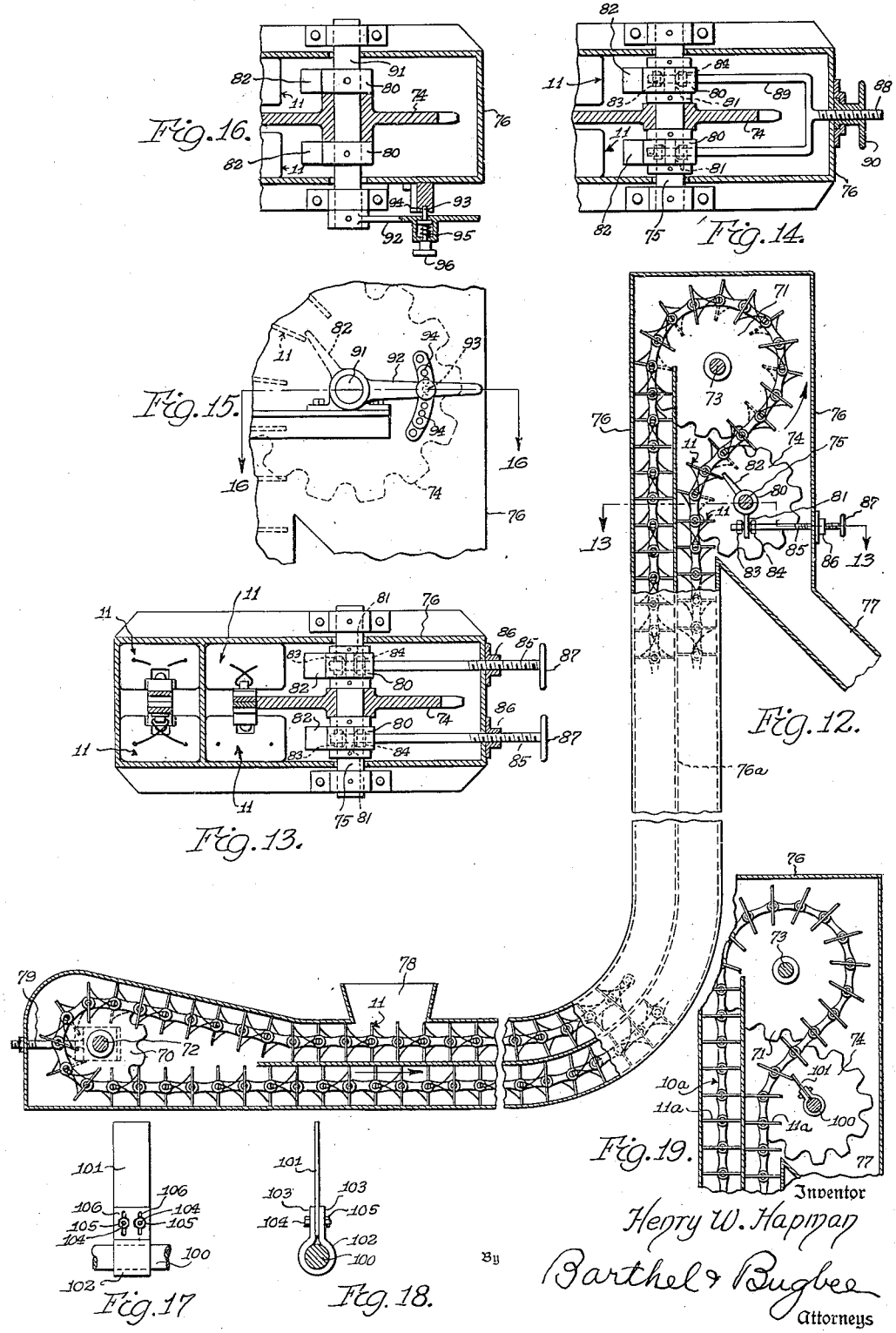

Patented Dec. 25, 1945

2,391,700

UNITED STATES PATENT OFFICE 2,391,700

RESILIENT FLIGHT CONVEYER

Henry W. Hapman, Detroit, Mich.

Application March 23, 1942, Serial No. 435,847

24 Claims. (Cl. 198—170)

The present invention relates to conveyers, and more particularly to flight conveyers.

One object of this invention is to provide a flight conveyer wherein the flights are pivotally mounted upon the conveyer chain and are also resiliently and yieldingly connected to the conveyer chain by resilient members such as spring braces.

Another object is to provide a flight conveyer wherein the flights are formed with ears adjacent one edge thereof, these ears being pivotally mounted upon the conveyer chain, spring braces being provided for yieldingly holding the flights in position substantially perpendicular to the path of travel of the conveyer chain.

Another object is to provide a flight conveyer as set forth in the preceding objects wherein the resilient braces are formed of spring wire having a bent loop for engaging one of the pivot pins of the conveyer chain.

Another object is to provide a flight conveyer as set forth in the preceding objects wherein the resilient braces are yieldable so that the flight conveyer may travel under a material load and the flights of the conveyer may yield opposite and laterally of the direction of conveyer travel so that said flights will yield in two different planes.

Another object is to provide a flight conveyer as set forth in the preceding objects wherein stop means is provided for limiting the motion of the flight in one direction such as the direction of conveyer travel.

Another object is to provide a flight conveyer having resiliently mounted flights supported on a conveyer chain, means being provided for forcibly tilting the conveyer flights adjacent the discharge opening of the conveyer and at a predetermined position relative thereto so as to assist in discharging and dislodging the materials carried by the flights.

Another object is to provide a conveyer housing having parallel adjacent courses uniquely arranged to eliminate friction between the conveyer flights and the wall surfaces of the conveyer housing and to provide a housing structure in which the divisional wall extends to the axis of one of the conveyer sprockets.

Another object of the invention is to provide a conveyer flight member which is limited against movement in one direction by a portion of the supporting and carrying chain and preferably near the hinge of said chain so that the movement of the material will be effected in one direction and the load thereof will be supported by the flexible braces in a yieldable manner and the material will be discharged by vibrating the flight and causing the material to be agitated and discharged at the discharge station.

Another object of the invention is to cause the material being conveyed to be thrown forward toward the discharge opening of the conveyer and to dislodge material therefrom during the circuitous travel of the conveyer as it passes the conveyer discharge, which is accomplished by offsetting one of the conveyer sprockets and providing an additional sprocket to cause a portion of the conveyer to traverse the discharge opening diagonally thereof.

Another object of the invention is to double tilt the conveyer flights above the conveyer discharge point so that the flights will be rocked in first one direction and then the other to facilitate the removal of material adhering thereto.

Another object of the invention is to provide a conveyer having rigidly mounted flights with resilient vibrating means engaging said flights adjacent the conveyer discharge to vibrate the flights and dislodge material adhering thereto.

In the drawings:

Figure 1 is a top plan view, partly in section, of a portion of a flight conveyer according to a preferred embodiment of the invention;

Figure 2 is a side elevation, partly in section;

Figure 3 is a vertical cross section taken along the line 3—3 of Figure 2 looking in the direction of the arrows illustrating in detail the connection between the conveyer flights and the yieldable braces attached to the conveyer chain;

Figure 4 is a perspective view of a modified form of the invention;

Figure 5 is a top plan view of another modified form of the invention;

Figure 6 is a side elevation of the modification shown in Figure 5;

Figure 7 is a vertical cross section taken along the line 7—7 of Figure 6 looking in the direction of the arrows showing in detail the construction and manner of connecting the yieldable braces to the conveyer and flights;

Figure 8 is a perspective detail view showing the means for holding the outer ends of the spring braces;

Figure 9 is a top plan view of one of the spring braces;

Figure 10 is a side elevation partly in section, of the flight conveyer of the invention as applied to a run-around type of conveyer;

Figure 11 is a vertical cross section taken along the line 11—11 of Figure 10 looking in the direction of the arrows illustrating the position of the flight, conveyer chain and spring braces;

Figure 12 is a side elevation, partly in section, showing an endless conveyer of the type set forth in the present invention wherein additional means is provided for forcibly tilting the conveyer flights to facilitate discharge of the materials carried thereby;

Figure 13 is a horizontal section taken along the line 13—13 of Figure 12 looking in the direction of the arrows showing an adjustable tripper for vibrating the conveyer flights;

Figure 14 is a view similar to Figure 13 but showing a modification thereof in which a single adjusting means is provided for rocking the tripper members;

Figure 15 is a side elevation of a further modified form of the device for forcibly tripping the resilient conveyer flights;

Figure 16 is a horizontal section taken along the line 16—16 of Figure 15 looking in the direction of the arrows illustrating the structural details thereof;

Figure 17 is a front elevation of a modified form of tripping member illustrating a resilient vibrating bar to be used in lieu of the vibrating bar shown in Figures 12 to 16 inclusive;

Figure 18 is an edge elevation of the same showing the manner in which the flexible vibrating bar is anchored to the supporting shaft for adjustment relative thereto;

Figure 19 is a fragmentary sectional view showing a still further modified form of the invention employing rigidly mounted flights adapted to be vibrated by a flexible tripper similar to the tripper shown in Figures 17 and 18; and Figure 20 is a top plan view of one of the yieldable spring braces employed in the form of the invention shown in Figures 1 to 3 inclusive.

General arrangement

In general, the flight conveyer of this invention consists of a conveyer chain with links and pivot pins traveling in the usual orbital path. One set of pivot pins carries plate-like flights, each of which is connected to the pivot pin immediately preceding it by means of a spring brace, which spring brace is tensioned slightly greater than the weight of the load imposed on the flight. As the flight is pivotally mounted upon the chain pivot pin, and as the spring braces are resilient, a resilient mounting of the conveyer flight is thus accomplished so that the flights will have a multi-plane swing in a direction opposite to the direction of conveyer travel when the flights are overloaded or encounter obstructions in the path thereof.

The spring brace preferably consists of a wire bent approximately into U-shaped formation with the lower ends joined by a mid-portion. This mid-portion is mounted in a slot in one of the chain pivot pins which slot is of a depth to limit the inward movement of the mid-portion and prevent binding of the conveyer chain pivot pins, and said mid-portion is further secured in place by means of a cotter pin or other suitable pin. The free ends of the spring brace are connected in any suitable way to the conveyer flight at locations near their outer side edges and when positioned as above, are flexed so that said free ends will remain in position relative to the flight and under tension.

The modification shown in Figure 4 substitutes a resilient flat strip for the spring brace of Figures 1 to 3 inclusive. The inner end of this spring strip lies parallel with the side links of the conveyer chain and is secured to the pivot pins thereof.

The modification shown in Figures 5 to 9 inclusive is similar to the form shown in Figures 1 to 3 inclusive in that a spring brace is also employed. The modified spring brace, however is of approximately U-shaped form with diverging ends connected to the flight near its opposite edges. The mid-portion of the spring is provided with a loop of circular formation which is secured to the adjacent pivot pin of the conveyer chain (Figure 9). In the modification shown in Figures 10 and 11 the conveyer flights are mounted on one side only of the conveyer chain so as to form a runaround conveyer. The conveyer chain passes through the conveyer conduit in a path near the top thereof. The conveyer conduit is ordinarily horizontal, so that the conveyer flights extend downward beneath the conveyer chain. In the modification of Figures 12 to 19 inclusive, various means are provided for forcibly tripping or tilting the conveyer flights as they arrive opposite the discharge spout or conduit. This provides a snapping and vibrating action which dislodges material from the conveyer flights and facilitates the easy unloading and discharge of the material carried thereby.

Flight conveyer with crossed brace construction

Referring to the drawings in detail, Figures 1 to 3 inclusive and 20 show one embodiment of the invention as including a conveyer chain, generally designated 10, having flights generally designated 11, pivoted thereto and braced by a U-shaped brace generally designated 12 (Figure 20). The chain 10 is of approximately the same construction for the different forms of the invention. The chain 10 consists of a flat pair of outer and inner links 13 and 14 respectively (Figure 2), having apertures 16 and 17 therethrough for the passage of pivot pins 18.

A rotatable conveyer flight support 19 is also provided adjacent the head 20 of the pivot pin 18, and has a bore 21 therethrough for the passage of the pivot pin 18 so that the flight support 19 may freely rotate upon said pivot pin 18. The flight support 19 is approximately in the form of a thick washer having a portion 22 projecting laterally therefrom and provided with a transverse bore 23 at right angles to the bore 21. The bore 23 is arranged to receive a pivot pin 24 upon which the flights 11 are pivotally supported and one end of the pivot pin 24 is provided with a rivet-like head 25 while the opposite end of the pin 24 is provided with a transverse opening for receiving a cotter pin 25a for preventing the withdrawal of said pivot pins.

The chain pivot pins 18 are also provided with washers 26 adjacent their outer ends, these being slotted as at 27 to receive the mid-portions of the yieldable braces 12 and said slots are formed of a depth to limit the inward movement of the mid-portions of the braces 12 to allow free play of the pivot pins 18 and prevent binding of the conveyer chain elements. The pivot pins 18 adjacent the slots 27 are also provided with transverse bores 28 for receiving cotter pins 29 adapted to hold the braces 12 therein as described below.

The flights 11 (Figure 3) include plate-like portions 30 having spaced ears stamped out of an aperture 32 in the lower edge of the portion 30. The ears 31 are bent parallel with each other and have apertures 33 therethrough for receiving the pivot pins 24 so that said flights may rock on said pivot pins in a direction opposite to the conveyer travel. The aperture 32 is provided with an extension aperture 34 (Figure 3) adapted to permit the flight 11 to tilt to and fro without interfering with the head 20 of the pivot pin 18. The flights 11 are also provided with bosses 35 (Figure 1) struck out of plate-like portions 30 and having apertures 36 therethrough.

The braces 12 are preferably of spring wire or rod stock initially bent as shown in Figure 20 with one pair of ends joined. The free ends of the braces 12 are crossed and placed under tension to cause the straight portions to curve and flex as shown in Figure 1 so that the flights 30 will be yieldingly urged against the conveyer load and against the stop shoulder 32 abutting the rotatable flight support 19. The extreme free ends of the brace 12 are bent as at 37 and have straight end portions 38 passing through the apertures 36 in the bosses 35. The supporting portions 39 of the brace 12 are crossed as at 40 and beyond the crossing point are bent at 41 to provide a connecting portion 42 extending between the bent portions 41 and seated in the slot 27 of the pivot pin 18 behind the cotter pin 29. The braces 12 may be pulled or pushed into flatter or more strongly curved arcs, thereby permitting the flights 11 to yield in two different planes. When the conveyer flight is tilted or rocked on the pivoted flight support 19 relative to the pin 18, one of the spring braces 39 would have a tendency to assume a more strongly curved arc while the other portion 39 would have a tendency to be attenuated.

In the operation of the form of the invention shown in Figures 1 to 3 inclusive and 20, the conveyer chain 10 with its attached flights 11 and braces 12 is caused to pass through a suitable conduit 43 (Figure 3) and is propelled by sprockets (not shown) of conventional design and driven by conventional mechanism (not shown). The flights 11 carry along with them the material which is fed into the conveyer conduit 43 and delivered at the desired location. Should the flights 11 encounter an obstruction or be jammed by material adhering to the flights or conduit 43, they will yield around their pivot pins 24 or about the axis of the pivot pin 18, and the spring braces 12 will store up energy as they are bent into arcuate form. When the obstruction is passed, the flights 11 will be pushed back or returned to their normal position by the resilience of the spring braces 12. If one of the braces 12 should break, it can be easily and quickly replaced merely by withdrawing the cotter pin. The spring braces 12 are installed so that the initial tension imposed on the flights is greater than the load intended to be conveyed so that the flights will normally repel said load and will only flex when the load is increased beyond a predetermined point.

*Modified resilient flight conveyer*

In the modification of Figure 4 the conveyer chain 10 and flights 11 are similar to those shown in Figures 1 to 3 inclusive and are similarly designated. In lieu of the spring brace 12 in Figures 1 to 3, there is provided a flat spring brace, generally designated 44. This spring brace has a flat portion 45 which extends between two of the pivot bolts 46 which are used instead of the pivot pins 18 of Figures 1 to 3 inclusive. Behind the flight 11, the spring brace 44 is bent as at 47, 48 and 49 so as to pass around the flight support 19 and hook itself around the upper edge of the flight 11. The intermediate portions or edges, of the inclined spring brace 50 are reduced in width so that the flight 11 may rotate with the washer 19 by reason of the reduced portion of the inclined brace 50. The inclined brace is thus allowed to twist slightly to facilitate the rocking of the flight 11 within certain limits about the axis of the pivot 46. Said flight 11 is also capable of swinging movement on the pivot 24 in a direction opposite to the direction of conveyer travel.

In the operation of the modification shown in Figure 4, when the flight 11 encounters an obstruction or irregularity in the conduit 43, the inclined portion 50 of the spring brace 44 springs backwards so as to yield and permit the obstruction to be passed. When this occurs the flight pivots around the pivot pin 24 and swings backward. The flight may yield in two planes and may swing laterally or longitudinally of the conveyer. After the obstruction or irregularity has been passed, the flight 11 swings back to its normal position by the resilience of the spring brace 44.

In the modification shown in Figures 5 to 9 inclusive, the construction of the conveyer chain 10 and flights 11 are approximately the same as in the form shown in Figures 1 to 3 inclusive, with minor variations described below. The spring braces, generally designated 51, however, are of approximately W-shaped form with arcuately curved side arms 52 which are normally straight as shown in Figure 9 having their free ends 53 passing through the struck-up guides 54 in the flights 11 and engaging struck-up tabs 55 (Figure 8). The guides 54 are pressed down upon the ends 53 of the spring braces 51 so as to hold the latter firmly. The relatively straight spring braces 52 are bent into arcuately curved shape when applied to the conveyer and flight to place the flight under tension, which tension is greater than the weight of the load being conveyed.

The mid-portion of the spring brace 51 is formed with a reverse loop 56 (Figure 9) by bending the brace back on itself at the bends 57, leaving a gap 58 therebetween. The loop 56 thus formed receives the pivot bolt 59 which is substituted for the pivot pin 18 of Figures 1 to 3 inclusive and is held in position by the nut 60 threaded upon the end thereof. A washer 61 beneath the nut 60 prevents the loosening of the connection through vibration or other causes.

In the operation of the modification shown in Figures 5 to 9 inclusive, the conveyer, as before, traverses the conveyer conduit 43 (Figure 3) and carries the material along with it. When an obstruction or irregularity is encountered, the flight 11 swings rearwardly around its pivot pin 24 or swings about the pivot pin 59, causing the side portions 52 of the spring brace 51 to bend into arcs of shorter radii, storing up energy. When the obstruction has been passed, the flights 11 are pushed back to their normal positions by the resilience of the spring braces 51. On the other hand, the spring braces 51 may be attenuated, thereby enabling the flights to yield in a multi-plane swing.

The modification shown in Figures 10 and 11 employing the same type of conveyer chain 10, flight 11 and spring brace 12, 44 or 51, is of the runaround type of conveyer. The chain 10 has flights 11 on only one side of the chain, which passes through the conduit 62 at a point near the top wall 63 thereof. The latter is secured as at 64 to the trough portion 65 of the conveyer conduit 62. The conveyer conduit 62 is usually arranged in a horizontal orbit so that the single row of flights 11 extend downwardly from the chain 10 and carries the material from one location to another. When an obstruction or irregularity is reached, the spring braces yield and the flight 11 swings rearwardly as before about its pivot pin 24 or may swing about the pivot pin 18, but is restored to its original position later by the resilience of its spring brace.

*Mechanism for forcibly tilting resilient flights*

Figures 12 to 18 inclusive show a flight conveyer of the type described previously wherein means is provided for forcibly tilting the flights as they arrive opposite the discharge opening. The endless conveyer and its flights are of the type shown in Figures 1 to 3 inclusive, and accordingly bear similar reference numerals. This endless conveyer is mounted on sprockets 70 and 71 (Figure 12) mounted respectively on shafts 72 and 73 and engaged by an idler sprocket 74 mounted on a shaft 75 in the upper end of the housing 76 adjacent the discharge conduit 77 thereof. Near the opposite end of the conveyer housing 76 an inlet 78 is provided into which the materials are dumped for conveyance elsewhere. A slack take-up device 79 is connected to the shaft 72 for adjusting the position of the shaft 72 and consequently taking up slack in the conveyer chain.

The idler sprocket 74 is located adjacent the discharge opening 77 to cause the flights 11 to tilt thereabove so that the material will drop therefrom into said discharge. Continued travel of the flights about the sprocket 71 causes the same to tilt in the opposite direction and thereby dislodge any material adhering to the flights so that the material will fall downwardly into the discharge chute 77. A central division wall 76a extends from a point adjacent the sprocket 70 to the sprocket 71 and terminates at a point horizontal with respect to the shaft 73 so that material falling from the flights as they are tilted in reverse directions while traversing the sprockets 74 and 71 will fall downwardly into the discharge chute and the material will not be carried down the unloaded side of the conveyer.

Mounted upon the shaft 75 on opposite sides of the sprocket 74 are hubs 80 provided with arms 81 and 82. The arms 82 project inwardly toward the conveyer flights 11 so that the free ends engage and tilt the flights with a snap action as the flights 11 move past the ends of the arms 82. The arms 81 are engaged by abutments 83 and 84 on screw shafts 85 threaded through threaded bosses 86 mounted on the casing 76 and adjustable by hand wheels 87. By this means, the positions of the ends of the tripping arms 82 may be adjusted relative to the conveyer flights 11 so as to regulate the extent of the tripping and vibrating action. The modification shown in Figure 14 is similar to that of Figure 13, except that a single screw shaft 88 is provided and connected to a yoke 89 which in turn is connected to the arms 81 in a similar way. A threaded hand wheel 90 serves to adjust the positions of the tripping arm 82 relatively to the flights 11. The modification shown in Figures 15 and 16 is similar in principle to the modification shown in Figures 12 to 14 inclusive, except that a different adjustment is provided for the tripping arms 82. These are rigidly or resiliently mounted upon the shaft 91 whereas the sprocket 74 is loosely mounted thereon. The shaft 91 carries an arm 92 mounted on the outer end thereof and provided with a locking pin 93 movable into and out of engagement with locking holes 94 arranged in an arcuate path. A coil spring 95 urges the locking pin 93 into the holes 94, whereas a head 96 is provided for pulling the pin 93 and enabling the readjustment of the arm 92 and consequently the repositioning of the tripping arms 82.

In the modification shown in Figures 17 and 18, a resilient tripping and vibrating member may be secured to the shaft 100 which corresponds to the shaft 75 in Figures 12 to 14 inclusive. As shown in Figures 17 and 18, a resilient trip member 101 formed of a relatively flat spring is secured to the shaft 100 by means of a divided collar 102 having opposed flange portions 103 between which the flat spring vibrating member is adapted to be seated and held in place by a bolt 104 having a nut 105 threaded on the opposite end thereof. The flanged members 103 are provided with slots 106 in which the bolt 104 may operate so that the resilient spring agitator 101 may be moved toward or away from the conveyer flight to a predetermined position so as to adjust the degree of vibration or agitation of said flights resulting in the dislodgement of the material carried thereby into the discharge outlet.

In the modification shown in Figure 19, the conveyer casing 76 is substantially identical to the form of the invention shown in Figures 12 to 16 inclusive and said casing is provided with a shaft 73 carrying a sprocket 71 mounted in the upper end thereof. Beneath the shaft 73, a shaft 100 may be provided and secured to said shaft is an idle sprocket 74 to cause the conveyer chain 10a to traverse the discharge opening 77 for dislodging the material carried by the flights 11a. The conveyer 10a is slightly different from the conveyer shown in Figures 1 to 16 inclusive and has the flights 11a rigidly secured thereto. By employing a resilient vibrator 101, the rigid flights will receive a vibratory action set up by the resilient action of the spring arm 101.

The tripping arm 101 shown in Fig. 19 may be substituted in lieu of the tripping arm 82 shown in Figs. 12 to 16 inclusive, or if desired, the conveyer may have rigid flights with resiliently mounted flights interspersed throughout the conveyer course. By employing a resilient tripping spring arm 101 both types of flights may be accommodated when the conveyer is made up of both resiliently mounted and rigid flight members.

It is to be understood, that the flights of the conveyer shown in Figures 1 to 16 inclusive are capable of being tilted in a direction rearwardly of the conveyer travel and are limited against movement in the other direction. That is, the flights 11 may tilt against the action of the prestressed springs 12 so that the load will be resiliently supported, and said limiting movement in the other direction such as the direction of conveyer travel is effected in Figures 1 to 3 inclusive by the shoulders 32 engaging the annular rotary member 19 on the chain pintle 18. Similarly, the limiting of the movement of the flights 11 in the direction of travel is controlled in Figure 4 by the shoulder of the cutout 32 engaging the top edge of the rotary flight support 19.

Likewise, the flights shown in Figures 5 to 11 inclusive are limited against movement in a direction with the flight travel by said notched shoulder portions 32. While a specific embodiment of the invention has been shown and illustrated, it will be understood that various modifications may be made within the scope of the appended claims without departing from the spirit of the invention.

What I claim is:

1. In a flight conveyer, elongated conveying means moving in an extended path, swivel blocks carried by said conveying means in spaced apart relation, conveyer flights yieldingly mounted on said conveying means and pivotally attached to said swivel blocks to swing from a normal position perpendicular to the conveying means in a direction opposite to the direction of conveyer travel and limited against movement in the direction of conveyer travel beyond the normal perpendicular position, and resilient braces arranged between said conveying means and said flights and yieldingly urging said flights against their normal positions of limited travel and into positions transverse to said conveying means about the axes of said swivel blocks and pivotal attachment of said flights, the axis of said swivel blocks and flight pivots being at right angles one to the other.

2. In a flight conveyer, elongated conveying means moving in an extended path, swivel blocks rotatably carried by said conveying means in spaced apart relation, conveyer flights yieldingly mounted on said conveying means and pivotally attached to said swivel blocks to swing from a normal position perpendicular to the conveying means in a direction opposite to the direction of conveyer travel and limited against movement in the direction of conveyer travel beyond the normal perpendicular position, and resilient braces engaging the rearward walls of said flights and secured to said conveying means for yieldingly urging said flights against their normal positions of limited travel and into positions transverse to said conveying means about the axis of said swivel blocks and the axis of pivotal attachment of said flights, the axes of said swivel blocks and flights being offset and extending at right angles to one another.

3. In a flight conveyer, elongated conveying means moving in an extended path, swivel blocks mounted on said conveying means to pivot in a plane parallel with the plane of the conveyer means, conveyer flights yieldingly mounted on said conveying means and pivotally attached to said swivel blocks to swing in a plane transverse to the pivot plane of said swivel blocks, and resilient braces bent into arcuate form arranged between said conveying means and said flights and yieldingly urging said flights into positions transverse to said conveying means.

4. In a flight conveyer, elongated conveying means moving in an extended path, swivel blocks mounted on said conveying means to pivot about an axis extending transversely thereof, conveyer flights yieldingly mounted on said conveying means and pivotally attached to said swivel blocks to pivot about an axis at right angles to said swivel axis, and resilient braces having crossed arms arranged between said conveying means and said flights and yieldingly urging said flights into positions transverse to said conveying means.

5. In a flight conveyer, elongated conveying means moving in an extended path, swivel blocks mounted on said conveying means to pivot about an axis extending transversely thereof, conveyer flights yieldingly mounted on said conveying means and pivotally attached to said swivel blocks to pivot about an axis at right angles to said swivel axis, and resilient braces having intermediate portions secured to said conveying means and arms extending therefrom to said flights for yieldingly urging said flights into positions transverse to said conveying means about the multi-plane axes thereof.

6. In a flight conveyer, elongated conveying means moving in an extended path, swivel blocks mounted on said conveying means to pivot about an axis extending transversely thereof, conveyer flights yieldingly mounted on said conveying means and pivotally attached to said swivel blocks to pivot about an axis at right angles to said swivel axis, and resilient braces having intermediate portions secured to said conveying means and crossed arms extending therefrom to said flights for yieldingly urging said flights into positions transverse to said conveying means.

7. In a flight conveyer, elongated conveying means moving in an extended path, swivel blocks mounted on said conveying means to pivot about an axis extending transversely thereof, conveyer flights yieldingly mounted on said conveying means and pivotally attached to said swivel blocks to pivot about an axis at right angles to said swivel axis, and resilient braces having intermediate portions secured to said conveying means and arcuately bent arms extending therefrom to said flights and yieldingly urging said flights into positions transverse to said conveying means.

8. In a flight conveyer, elongated conveying means moving in an extended path, conveyer flights yieldingly and pivotally mounted on said conveying means to pivot about a pair of axes at right angles to each other, and spring strips having flat portions extending along said conveying means and bent portions extending obliquely outward from said flat portions to said flights and yieldingly urging said flights into positions transverse to said conveying means.

9. In a flight conveyer, elongated conveying means moving in an extended path, conveyer flights yieldingly and pivotally mounted on said conveying means to pivot about a pair of axes at right angles to each other, and spring strips having flat portions extending along said conveying means and bent portions extending obliquely outward from said flat portions to said flights and yieldingly urging said flights into positions transverse to said conveying means, said spring strips having a portion bent over the outer edge of said flight.

10. In a flight conveyer, elongated conveying means having link members connected by pivot pins moving in an extended path, conveyer flights yieldingly mounted on said conveying means, and resilient braces of approximately U-shaped form secured at their mid-portions to the pivot pins of said conveying means and at their outer ends to said flights.

11. In a flight conveyer, elongated conveying means moving in an extended path, conveyer flights yieldingly mounted on said conveying means, and resilient braces of approximately U-shaped form secured at their mid-portions to said conveying means and at their outer ends to said flights, said mid-portions of said braces being inversely bent into loops.

12. In a flight conveyer, elongated conveying means moving in an extended path, conveyer flights yieldingly mounted on said conveying means, and resilient braces of approximately U-shaped form secured at their mid-portions to said conveying means and having arms bent arcuately outward and secured at their outer ends to said flights.

13. In a flight conveyer, elongated conveying means moving in an extended path, conveyer flights yieldingly mounted on said conveying means, and resilient braces of approximately U-shaped form secured at their mid-portions to said conveying means and having arms bent arcuately outward and secured at their outer ends to said flights, said mid-portions of said braces being inversely bent into loops.

14. In a flight conveyer, a conveyer chain having links and pivot pins, flight supports pivotally secured to said pivot pins to swivel in a plane parallel with the plane of said conveyer chain, flights pivotally secured to said flight supports to swing from a normal position perpendicular to the conveying means in a direction opposite to the direction of conveyer travel and limited against movement in the direction of conveyer travel beyond the normal perpendicular position and resilient braces extending from said conveyer chain to said flights and yieldingly urging said flights against their normal positions of limited travel and into positions transverse to said conveying means, said flight supports providing a surface engageable by said flights to limit against pivotal movement of said flights in said direction of conveyer travel beyond the normal perpendicular position.

15. In a flight conveyer, a conveyer chain having links and pivot pins, flight supports secured to said pivot pins, flights pivotally secured to said flight supports and resilient braces extending from said conveyer chain to said flights and yieldingly urging said flights into positions transverse to said conveying means, said resilient braces having their mid-portions secured to said conveyer chain and crossed arms extending outwardly therefrom to said flights.

16. In a flight conveyer, a conveyer chain having links and pivot pins, flight supports secured to said pivot pins, flights pivotally secured to said flight supports and resilient braces extending from said conveyer chain to said flights and yieldingly urging said flights into positions transverse to said conveying means, said resilient braces having their mid-portions secured to said pivot pins of said conveyer chain and crossed arms extending outwardly therefrom to said flights.

17. In a flight conveyer, a conveyer chain having links and pivot pins, flight supports secured to said pivot pins, flights pivotally secured to said flight supports and resilient braces extending from said conveyer chain to said flights and yieldingly urging said flights into positions transverse to said conveying means, said resilient braces having loops at their mid-portions secured to said pivot pins and arms extending outwardly therefrom to said flights.

18. In a flight conveyer, a conveyer chain having links and pivot pins, flight supports secured to said pivot pins, flights pivotally secured to said flight supports having struck-up lugs projecting rearwardly from said flights and resilient braces extending from said conveyer chain to said flights and yieldingly urging said flights into positions transverse to said conveying means, the ends of said braces being held secured to said flights by being received in openings in said struck-up lugs on said flights.

19. In a flight conveyer, elongated conveying means moving in an extended path, conveyer flights yieldingly mounted on said conveying means, and resilient braces arranged between said means and said flights and yieldingly urging said flights into positions transverse to said conveying means, and pivoted adjustable tripping means engageable with said flights and adapted to forcibly tilt the flights to facilitate the discharge of the materials carried thereby.

20. In a flight conveyer, elongated conveying means moving in an extended path, conveyer flights yieldingly mounted on said conveying means, and resilient braces arranged between said means and said flights and yieldingly urging said flights into positions transverse to said conveying means, tripping means engageable with said flights and adapted to forcibly tilt the flights to facilitate the discharge of the materials carried thereby and means for adjusting the position of said tilting means relatively to said conveyer flights.

21. In a flight conveyer, elongated conveying means moving in an extended path, conveyer flights yieldingly mounted on said conveying means, and resilient braces arranged between said means and said flights and yieldingly urging said flights into positions transverse to said conveying means, flexible tripping means engageable with said flights and adapted to vibrate the flights to facilitate the discharge of the material carried thereby.

22. A conveyer comprising a housing having an inlet and discharge station adjacent each end thereof, conveyer sprockets mounted at each end of the housing, an endless conveyer chain trained over said sprockets, resiliently mounted flight members carried by said chain, a division plate extending longitudinally of the housing and separating the conveyer courses, means for guiding said conveyer chain over the discharge opening at one end of the conveyer to discharge the material and to prevent the discharge course from frictionally contacting the walls of said housing and means adjacent the discharge station for vibrating said resiliently mounted flight members to agitate and dislodge material thereon.

23. A conveyer structure comprising a conveyer housing having inlet and discharge openings, an endless conveyer mounted in the housing, flights mounted on the endless conveyer, an idler sprocket located adjacent the discharge opening for guiding the conveyer in a tortuous path above the discharge opening and for tilting the flights as they traverse said discharge opening and means pivoted on the axis for said idle sprocket for engaging and vibrating the flights as they traverse said opening to dislodge material therefrom into the conveyer discharge.

24. A conveyer structure, comprising a conveyer housing having inlet and discharge openings, an endless conveyer mounted in the housing having its courses traveling through independent chambers therein, a conveyer sprocket mounted at each end of the housing, an idler sprocket located between one of said sprockets and the discharge opening to cause said conveyer to be guided in a tortuous path above the discharge opening and to tilt and dislodge material from the conveyer flights into said opening and means adjacent the discharge opening pivoted about the axis of the idler sprocket for vibrating the conveyer during its travel past said discharge and prior to its tilting operation.

HENRY W. HAPMAN.